United States Patent
Bitoh

(10) Patent No.: US 7,591,288 B2
(45) Date of Patent: Sep. 22, 2009

(54) FUEL FEEDER, ELECTRIC EQUIPMENT AND FUEL FEED SYSTEM THEREOF

(75) Inventor: Hiroyasu Bitoh, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 150 days.

(21) Appl. No.: 11/703,005

(22) Filed: Feb. 6, 2007

(65) Prior Publication Data
US 2007/0231638 A1 Oct. 4, 2007

(30) Foreign Application Priority Data
Mar. 29, 2006 (JP) .............................. 2006-090929

(51) Int. Cl.
B65B 31/04 (2006.01)
B65B 3/04 (2006.01)
B65B 3/26 (2006.01)

(52) U.S. Cl. .............................. 141/59; 141/83; 141/95; 141/311 R

(58) Field of Classification Search ................... 141/83, 141/94, 95, 59; 429/34
See application file for complete search history.

(56) References Cited

U.S. PATENT DOCUMENTS 4,934,419 A * 6/1990 Lamont et al. ................ 141/94
5,857,501 A * 1/1999 Kelerich et al. ................ 141/94
6,068,030 A * 5/2000 Tatsuno ......................... 141/94
6,237,647 B1 * 5/2001 Pong et al. ..................... 141/94
6,250,347 B1 * 6/2001 Tatsuno ....................... 141/198
6,382,269 B1 * 5/2002 Tatsuno ......................... 141/94
6,446,049 B1 * 9/2002 Janning et al. ................ 141/94
6,463,967 B1 * 10/2002 Boyle ........................... 141/94
2005/0074656 A1 * 4/2005 Koyama et al. ............... 429/34
2007/0068596 A1 * 3/2007 Corless et al. ................. 141/94

FOREIGN PATENT DOCUMENTS

| JP | 2005-209116 A | | 8/2005 |
| WO | WO 2004/031928 | * | 4/2004 |
| WO | WO 2004/049482 | * | 6/2004 |

OTHER PUBLICATIONS

Machine translation of JP 2005-209116.*

* cited by examiner

Primary Examiner—Timothy L Maust
Assistant Examiner—Nicolas A Arnett
(74) Attorney, Agent, or Firm—Frishauf, Holtz, Goodman & Chick, P.C.

(57) ABSTRACT

A fuel feeder includes a fuel reserve body reserving a fuel, a fuel feed unit feeding the fuel in the fuel reserve body to electric equipment, and a control unit controlling the fuel feed unit, wherein the control unit obtains equipment information from by the electric equipment and operates the fuel feed unit to feed the fuel to the electric equipment after the control unit has performed authentication of the electric equipment.

8 Claims, 5 Drawing Sheets

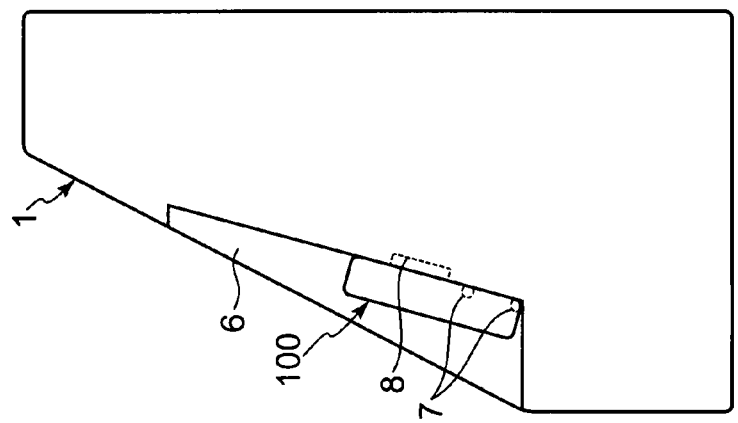
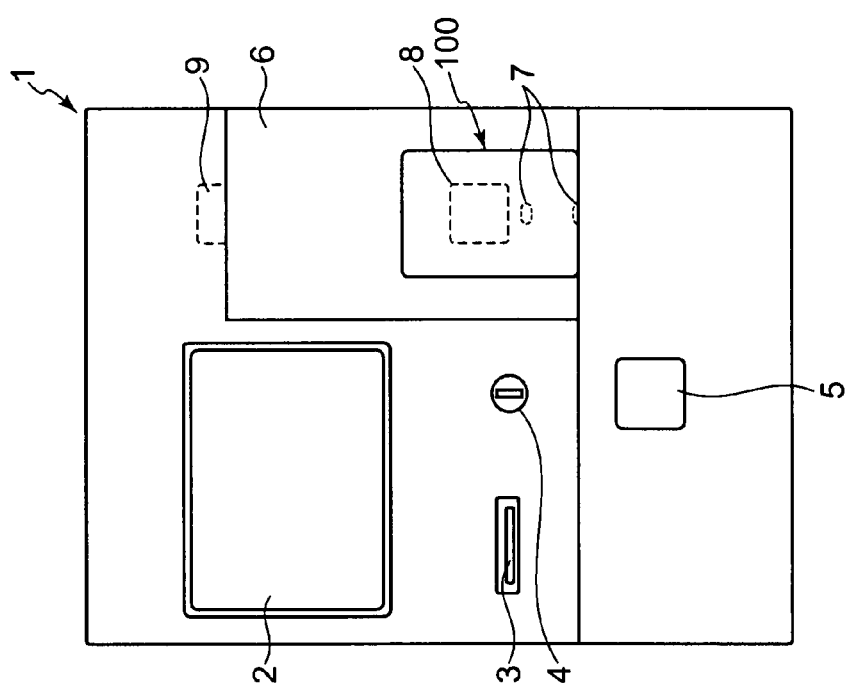

FIG. 4

| |
|---|
| MODEL NAME |
| MODEL NUMBER |
| PRESENCE OR ABSENCE OF SETTLEMENT FUNCTION |
| FUEL MODEL NUMBER |
| TANK CAPACITY |
| REMAINING FUEL QUANTITY |
| REMAINING WATER QUANTITY |
| FUEL FEED HISTORY (NEAREST PRECEDING FUEL FEED DAY) |

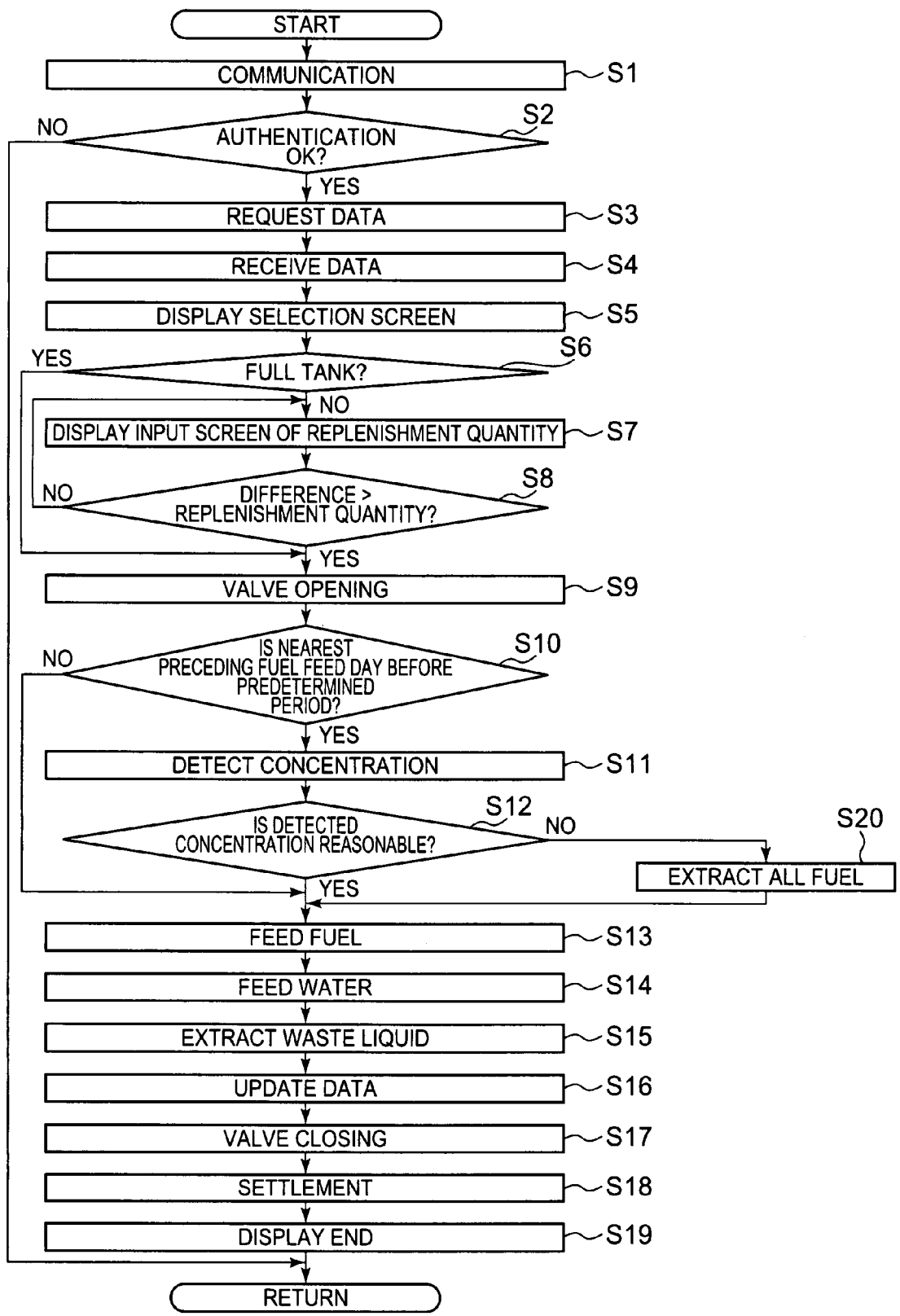

FUEL FEEDER, ELECTRIC EQUIPMENT AND FUEL FEED SYSTEM THEREOF

BACKGROUND OF THE INVENTION

1. Field of the Invention

The present invention relates to a fuel feeder feeding fuel to electric equipment using the fuel, the electric equipment to which the fuel is fed, and a fuel feed system thereof.

2. Description of Related Art

Fuel cells include reformer fuel cells, which extract electric power by an electrochemical reaction of hydrogen generated from fuel by a reformer or the like, and direct fuel type fuel cells, which extract electric power by an electrochemical reaction of fuel. There have been performed research and development for using such fuel cells as power sources of portable equipment (electric equipment) such as a portable telephone, a notebook-size personal computer, a digital camera, a wrist watch, a personal digital assistance (PDA), an electronic personal organizer and the like.

In order to widely spread the fuel cell installation type portable equipment, it is necessary to build an infrastructure for feeding fuel to the portable equipment. For example, something like a vending machine feeding fuel to a portable telephone after performing electric settlement has been examined.

There are various kinds of fuels, and consequently there is the possibility that a user injects an unsuitable fuel into portable equipment (electric equipment) and thereby the portable equipment is broken down or a harmful influence is exerted on the portable equipment.

It is the chief object of the present invention to provide a fuel feeder, electric equipment and a fuel feed system that a user can safely use a fuel suitable for the electric equipment in a suitable state.

SUMMARY OF THE INVENTION

In order to accomplish the above object, in accordance with a first aspect of the invention, a fuel feeder comprising: a fuel reserve body to reserve a fuel; a fuel feed unit to feed the fuel in the fuel reserve body to electric equipment; and a control unit to control the fuel feed unit, wherein the control unit obtains equipment information from the electric equipment and operates the fuel feed unit to feed the fuel to the electric equipment after the control unit has performed authentication of the electric equipment.

In accordance with a second aspect of the invention, an electric equipment comprising: a fuel reserve body to reserve a fuel; a valve to allow to feed a fuel to the fuel reserve body; a storage unit to store equipment information; a communication unit to transfer the equipment information to a fuel feeder; and a control unit to control the storage unit and the communication unit, wherein the communication unit transmits the equipment information read out from the storage unit by the control unit to the fuel feeder after an authentication has been performed between the electric equipment and the fuel feeder, the communication unit receives a command based on the equipment information from the fuel feeder, and the control unit opens the valve.

In accordance with a third aspect of the invention, a fuel feed system comprising electric equipment and a fuel feeder, wherein the electric equipment includes a storage unit storing an equipment information, the fuel feeder includes a fuel reserve body to reserve a fuel, a fuel feed unit to feed a fuel in the fuel reserve body to the electric equipment, and a control unit to control the fuel feed unit, the control unit obtains the equipment information stored in the storage unit and operates the fuel feed unit to feed a fuel after the control unit authenticates the electric equipment.

BRIEF DESCRIPTION OF THE DRAWINGS

The aforesaid and further objects, features and advantages of the present invention will become more apparent from the following detailed description when read in conjunction with the accompanying drawings, in which:

FIG. 1A is a front view of the external appearance of a fuel feeder;

FIG. 1B is a side view of the external appearance of the fuel feeder;

FIG. 4 is a view showing the data stored in a storage unit of the portable equipment; and FIG. 5 is a flow chart showing the flow of processing performed by a control unit of the fuel feeder.

DETAILED DESCRIPTION OF THE PREFERRED EMBODIMENTS

Figure 2:
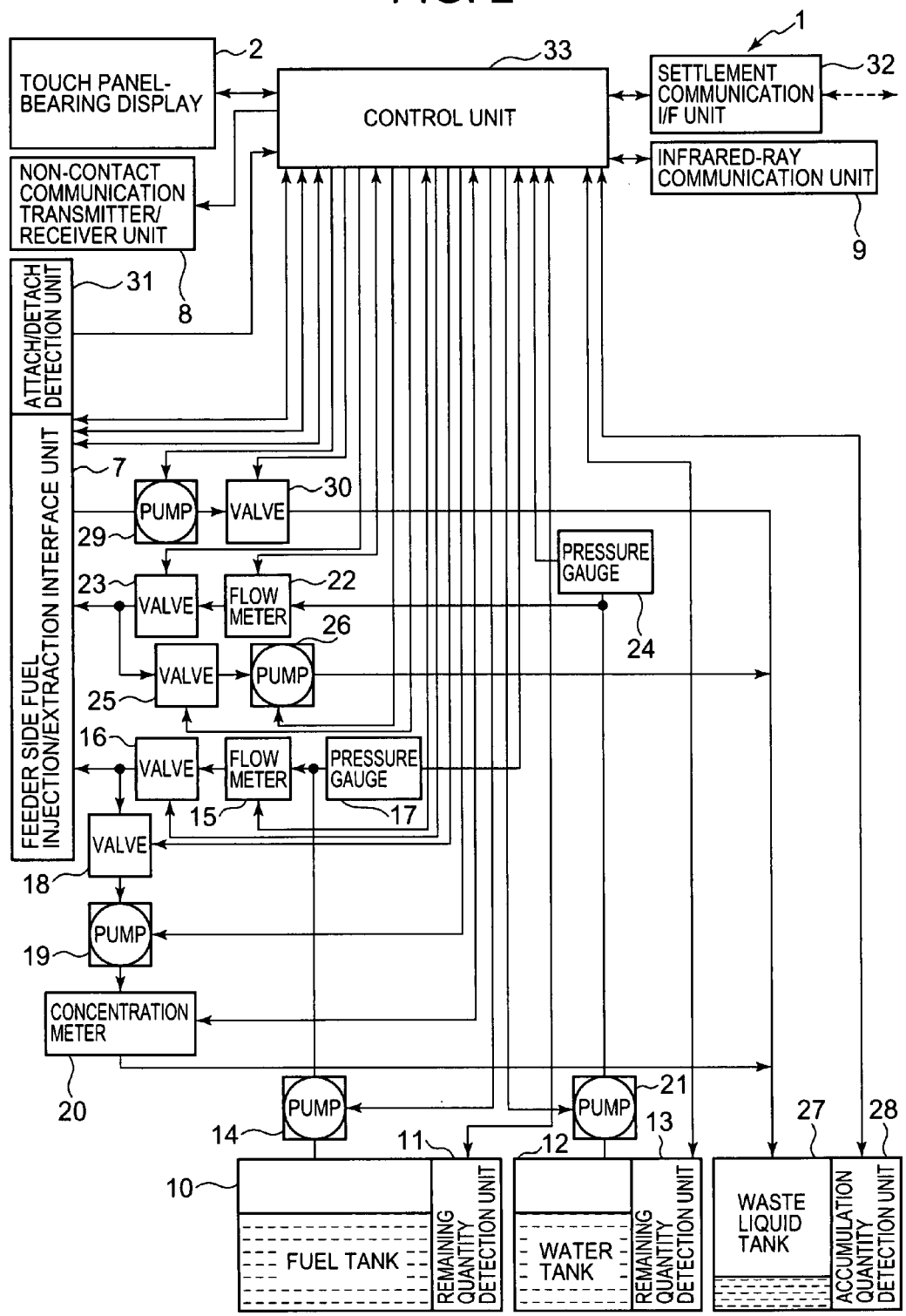
FIG. 2 is a block diagram of the fuel feeder.

In the following, the preferred embodiments of the present invention will be described with reference to the drawings. However, although various limitations that are technically preferable for implementing the present invention are put onto the embodiments described in the following, these limitations do not limit the scope of the present invention to the following embodiments and the shown examples.

FIGS. 1A and 1B are drawings showing a fuel feeder 1 together with a piece of portable equipment (electric equipment) 100. FIG. 1A is the front view thereof, and FIG. 1B is a side view.

The portable equipment 100 is a piece of small-sized electric equipment such as a portable telephone, a notebook-size personal computer, a digital camera, a wrist watch, a personal digital assistance (PDA), an electronic personal organizer and the like.

A touch panel-bearing display 2 is provided on the front of the fuel feeder 1; a bill throwing-in portion 3 and a coin throwing-in portion 4 are formed below the touch panel-bearing display 2; and a coin returning portion 5 is formed below the coin throwing-in portion 4. The touch panel-bearing display 2 is a display on the display surface of which a touch panel as an input unit is provided, and display is performed on the display thereof. A touched point to the touch panel is detected by the touch panel, and thereby various inputs are performed. A bill judgment device is provided in the bill throwing-in portion 3, and the classification of a bill thrown into the throwing-in portion 3 is judged by the bill judgment device. The coin throwing-in portion 4 is provided with a coin judgment device, and the classification of a coin thrown into the coin throwing-in portion 4 is judged by the coin judgment device.

A housing portion 6 is formed in a recessed state on the right side of the touch panel-bearing display 2 in the front of the fuel feeder 1, and the housing portion 6 is provided with a feeder side fuel injection/extraction interface unit 7. The portable equipment 100 is made to be detachably attachable to the housing portion 6. When the portable equipment 100 is mounted in the housing portion 6, the feeder side fuel injection/extraction interface unit 7 is connected to the portable equipment 100. Moreover, the housing portion 6 is provided with a non-contact communication transmitter/receiver unit 8 as a first communication unit, which makes it possible to wirelessly transfer data between the portable equipment 100 and the fuel feeder 1. Moreover, the housing portion 6 is provided with an infrared communication unit 9, which makes it possible to transfer data between the portable equipment 100 and the fuel feeder 1 by means of infrared rays.

Next, the configuration of the fuel feeder 1 is described with reference to FIG. 2. FIG. 2 is a block diagram of the fuel feeder 1.

A fuel (such as methanol, ethanol or dimethyl ether) is reserved in a fuel tank (fuel reserve body) 10. The fuel tank 10 is provided with a remaining quantity detection unit 11. A remaining fuel quantity reserved in the fuel tank 10 is detected by the remaining quantity detection unit 11, and an electric signal indicating the remaining fuel quantity is outputted from the remaining quantity detection unit 11 to a control unit 33.

Water is reserved in a water tank 12 which is provided with a remaining quantity detection unit 13. A remaining water quantity reserved in the water tank 12 is detected by the remaining quantity detection unit 13, and an electric signal indicating the remaining water quantity is outputted from the remaining quantity detection unit 13 to the control unit 33.

A waste liquid tank (waste fuel reserve body) 27 is provided with an accumulation quantity detection unit 28. An accumulated quantity of waste liquid accumulated in the waste liquid tank 27 is detected by the accumulation quantity detection unit 28, and an electric signal indicating the accumulated quantity of the waste liquid is outputted from the accumulation quantity detection unit 28 to the control unit 33.

A fuel feed pump (fuel feed unit) 14, a flow meter 15, a valve 16 and a pressure gauge 17 are provided along a path from the fuel tank 10 to the feeder side fuel injection/extraction interface unit 7. The fuel feed pump 14 is a pump for sucking fuel from the fuel tank 10 to send the sucked fuel to the feeder side fuel injection/extraction interface unit 7. The flow meter 15 is a meter for detecting the flow rate of the fuel sent by the fuel feed pump 14 to output an electric signal indicating the flow rate of the fuel to the control unit 33. The valve 16 is a valve for allowing and obstructing the flow of fuel from the fuel tank 10 to the feeder side fuel injection/extraction interface unit 7 by opening and closing the valve, respectively. The pressure gauge 17 is a gauge for detecting the pressure of the fuel sent by the fuel feed pump 14 to output an electric signal indicating the pressure of the fuel to the control unit 33.

The path from the valve 16 to the feeder side fuel injection/extraction interface unit 7 is branched to be connected to the waste liquid tank 27, and a valve 18, a fuel extraction pump (fuel extraction unit) 19 and a concentration meter 20 are provided along the path from the branching portion to the waste liquid tank 27. The valve 18 is a valve for allowing and obstructing the flow of the fuel from the feeder side fuel injection/extraction interface unit 7 to the waste liquid tank 27 by opening and closing the valve, respectively. The fuel extraction pump 19 is a pump for sending fuel from the feeder side fuel injection/extraction interface unit 7 to the waste liquid tank 27. The concentration meter 20 is a meter for detecting the concentration of the fuel sent by the fuel extraction pump 19 to output an electric signal indicating the concentration of the fuel to the control unit 33.

If the fuel is methanol, it is conceivable that the concentration of the methanol of the fuel lowers owing to an aged deterioration because the methanol more easily evaporates. The concentration meter 20 can measure a concentration by detecting a change of a natural frequency or a change of a refractive index owing to a change of a density.

A water feed pump (water feed unit) 21, a flow meter 22, a valve 23 and a pressure gauge 24 are provided along a path from the water tank 12 to the feeder side fuel injection/extraction interface unit 7. The water feed pump 21 is a pump for sucking water from the water tank 12 to send the sucked water to the feeder side fuel injection/extraction interface unit 7. The flow meter 22 is a meter for detecting the flow rate of the water sent by the water feed pump 21 to output an electric signal indicating the flow rate of the water to the control unit 33. The valve 23 is a valve for allowing and obstructing the flow of water from the water tank 12 to the feeder side fuel injection/extraction interface unit 7 by opening and closing the valve, respectively. The pressure gauge 24 is a gauge for detecting the pressure of the water sent by the water feed pump 21 to output an electric signal indicating the pressure of the water to the control unit 33.

The path from the valve 23 to the feeder side fuel injection/extraction interface unit 7 is branched to be connected to the waste liquid tank 27, and a valve 25 and a water extraction pump 26 are provided along the path from the branching portion to the waste liquid tank 27. The valve 25 is a valve for allowing and obstructing the flow of water from the feeder side fuel injection/extraction interface unit 7 to the waste liquid tank 27 by opening and closing the valve, respectively. The water extraction pump 26 is a pump for sending the water from the feeder side fuel injection/extraction interface unit 7 to the waste liquid tank 27.

A waste liquid extraction pump 29 and a valve 30 are provided along the path from the feeder side fuel injection/extraction interface unit 7 to the waste liquid tank 27. The waste liquid extraction pump 29 is a pump for sending waste liquid from the feeder side fuel injection/extraction interface unit 7 to the waste liquid tank 27. The valve 30 is a valve for allowing and obstructing the flow of the waste liquid from the feeder side fuel injection/extraction interface unit 7 to the waste liquid tank 27 by opening and closing the valve, respectively.

The feeder side fuel injection/extraction interface unit 7 is provided with an attach/detach detection unit 31. The attach/detach detection unit 31 is a unit for detecting the mounting of the portable equipment 100 to the feeder side fuel injection/extraction interface unit 7 to output a detection signal thereof to the control unit 33. Moreover, the feeder side fuel injection/extraction interface unit 7 is provided with a not shown data transfer terminal, which is connected to the control unit 33.

The infrared communication unit 9 is a unit for performing infrared communication to the portable equipment 100 based on a command from the control unit 33. The non-contact communication transmitter/receiver unit 8 is a unit for performing wireless communication to the portable equipment 100 for settlement based on a command of the control unit 33. A settlement communication interface unit 32 is a unit for performing the communication for settlement with external equipment based on a command of the control unit 33.

The touch panel-bearing display 2 is a display for performing various displays by being controlled by the control unit 33 and for performing various inputs by detecting touched points.

The control unit 33 includes a storage unit storing programs and various data, a CPU executing the processing in accordance with the programs stored in the storage unit, and a RAM providing a working area for temporary storage to the CPU. The control unit 33 controls the fuel feed pump 14, the valve 16, the valve 18, the fuel extraction pump 19, the water feed pump 21, the valve 23, the valve 25, the water extraction pump 26, the waste liquid extraction pump 29 and the valve 30 in accordance with the programs.

Figure 3:
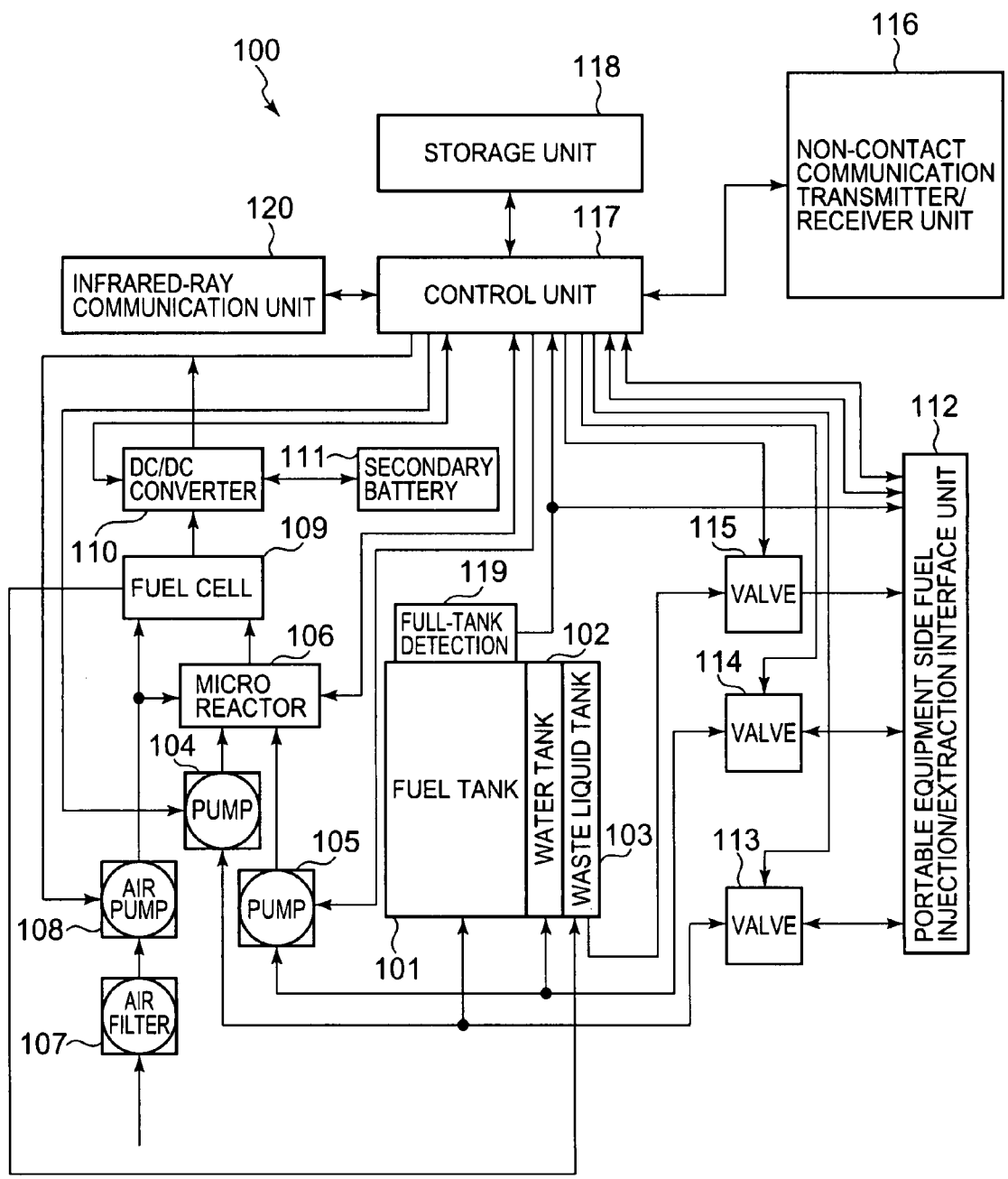
FIG. 3 is a block diagram of a piece of portable equipment.

Next, the configuration of the portable equipment 100 is described with reference to FIG. 3. FIG. 3 is a block diagram of the portable equipment 100.

A fuel is reserved in the fuel tank 101. The fuel tank 101 is provided with a full-tank detection unit 119 using an optical sensor or the like, and it is detected by the full-tank detection unit 119 that the fuel fills the fuel tank 101 to make it full tank. Then, a signal indicating the full tank is outputted from the full-tank detection unit 119 to a control unit 117. The fuel in the fuel tank 101 is sucked by a pump 104 to be sent to a micro reactor 106.

Water is reserved in a water tank 102. The water in the water tank 102 is sucked by a pump 105 to be sent to the micro reactor 106.

The air on the outside passes through an air filter 107 to be sucked by an air pump 108, and thereby dust in the air is trapped by the air filter 107. The air sucked by the air pump 108 is sent to the micro reactor 106 and a fuel cell 109.

The micro reactor 106 is equipped with a vaporizer, a reformer and a carbon monoxide remover. The water sent by the pump 104 and the fuel sent by the pump 105 are mixed to be fed to the vaporizer. In the vaporizer, the mixed liquid of the water and the fuel is vaporized, and a gaseous mixture of the water and the fuel is produced. The gaseous mixture vaporized in the vaporizer is sent to the reformer, and a reformed gas (a gaseous mixture of hydrogen, carbon dioxide, carbon monoxide and the like) is generated from the water and the fuel by the reformer. The reformed gas generated by the reformer is sent to the carbon monoxide remover, and is mixed with the air sent by the air pump 108 in the carbon monoxide remover. In the carbon monoxide remover, the carbon monoxide in the reformed gas is preferentially oxidized, and the carbon monoxide is removed from the reformed gas. The reformed gas is sent from the carbon monoxide remover to the fuel cell 109.

If the fuel reserved in the fuel tank 101 is methanol, the chemical reactions shown in the following formulae (1) and (2) are caused in the reformer, and the chemical reaction shown by the following formula (3) is caused in the carbon monoxide remover.

$$CH_3OH+H_2O \rightarrow 3H_2+CO_2 \quad (1)$$

$$H_2+CO_2 \rightarrow H_2O+CO \quad (2)$$

$$2CO+O_2 \rightarrow 2CO_2 \quad (3)$$

The fuel cell 109 is a fuel cell in which a Membrane-Electrode Assembly (MEA: comprising a gas diffusion layer which becomes an anode, a gas diffusion layer which becomes a cathode, and an electrolyte film which is connected to these gas diffusion layers in a state of being put between these gas diffusion layers) is supported in a state of being put between a current collector and a separator. The reformed gas is sent from the carbon monoxide remover of the micro reactor 106 to the anode, and air is sent from the air pump 108 to the cathode. Electric power is extracted by electrochemical reaction of hydrogen and oxygen in the fuel cell 109, and the electric power is accumulated in a secondary battery 111 or is fed to other loads after the voltage of the electric power has been converted by a DC/DC converter 110. Moreover, water is generated by the electrochemical reaction of the hydrogen and the oxygen in the fuel cell 109, and the water is sent to a waste liquid tank 103 to be accumulated in the waste liquid tank 103.

In addition, if the electrolyte film of the fuel cell 109 is an electrolyte film having hydrogen ion permeability (such as a solid polymer electrolyte film), a reaction expressed by the following formula (4) is caused at the anode, and hydrogen ions generated at the anode permeate the electrolyte film. A reaction expressed by the following formula (5) is caused at the cathode.

$$H_2 \rightarrow 2H^+ + 2e^- \quad (4)$$

$$2H^+ + \tfrac{1}{2}O_2 + 2e^- \rightarrow H_2O \quad (5)$$

A valve 113 to be opened and closed is provided on a path from the fuel tank 101 to a portable equipment side fuel injection/extraction interface unit 112. A valve 114 to be opened and closed is provided on a path from the water tank 102 to the portable equipment side fuel injection/extraction interface unit 112. A valve 115 to be opened and closed is provided on a path from the waste liquid tank 103 to the portable equipment side fuel injection/extraction interface unit 112.

When the portable equipment 100 is mounted in the housing portion 6 of the fuel feeder 1, the portable equipment side fuel injection/extraction interface unit 112 is connected to the feeder side fuel injection/extraction interface unit 7 of the fuel feeder 1. When the portable equipment side fuel injection/extraction interface unit 112 and the feeder side fuel injection/extraction interface unit 7 are connected to each other, paths from the valve 113 to the valve 16 and the valve 18 of the fuel feeder 1 are established; paths from the valve 114 to the valve 23 and the valve 25 are established; and a path from the valve 115 to the waste liquid extraction pump 29 is established.

An unshown data terminal is provided in the portable equipment side fuel injection/extraction interface unit 112, and the data transfer terminal is connected to the control unit 117. When the portable equipment side fuel injection/extraction interface unit 112 and the feeder side fuel injection/extraction interface unit 7 are connected to each other, the data transfer terminal of the portable equipment side fuel injection/extraction interface unit 112 and the data transfer terminal of the feeder side fuel injection/extraction interface unit 7 are connected to each other to make it possible to transfer data between the control unit 117 and the control unit 33, and the transmission of a full tank signal from the full-tank detection unit 119 to the control unit 33 becomes possible.

A non-contact communication transmitter/receiver unit 116 as a second communication unit includes an IC chip building therein an RFID system memory and an authentication algorithm, and a small-sized antenna. The non-contact communication transmitter/receiver unit 116 is a unit for performing wireless communication with the non-contact communication transmitter/receiver unit 8 of the fuel feeder 1 for settlement in accordance with a command of the control unit 117.

An infrared communication unit 120 is a unit for performing infrared communication with the infrared communication unit 9 of the fuel feeder 1 in accordance with a command of the control unit 117.

A storage unit 118 is a semiconductor memory, a magnetic storage medium or an optical storage medium. Programs readable and executable for the control unit 117 are stored in the storage unit 118. Moreover, as shown in FIG. 4, a "model name", a "model number", a "presence or absence of settlement function", a "fuel model number" and a "tank capacity" are previously stored in the storage unit 118 as data.

The control unit 117 includes a CPU executing the processing in accordance with the programs stored in the storage unit 118, and a RAM providing a working area for temporarily storage to the CPU.

The control unit 117 includes the following functions according to the programs stored in the storage unit 118. At the time of generating electricity (at the time of using the equipment or operating), the control unit 117 closes the valves 113-115, and operates the pump 104, the pump 105 and the air pump 108. At the time of feeding fuel, the control unit 117 opens the valves 113-115. Furthermore, the control unit 117 obtains the sent liquid quantity of the pump 104 based on the conducting time of the pump 104 at the time of generating electricity (at the time of operating), and obtains a remaining fuel quantity in the fuel tank 101 by being subtracting the sent liquid quantity to store the obtained remaining fuel quantity into the storage unit 118 as data as shown in FIG. 4. Moreover, the control unit 117 obtains the sent liquid quantity of the pump 105 based on the conducting time of the pump 105 at the time of generating electricity, and obtains a remaining water quantity in the water tank 102 by being subtracting the sent liquid quantity to store the obtained remaining water quantity into the storage unit 118 as data as shown in FIG. 4. Moreover, the control unit 117 stores the nearest (last) preceding day when fuel has been fed into the storage unit 118 as data as shown in FIG. 4. Moreover, the control unit 117 does not allow the pumps 104 and 105 to operate when the remaining fuel quantity stored in the storage unit 118 is zero.

The "model name", the "model number", the "presence or absence of settlement function", the "fuel model number" and the "tank capacity" among the data shown in FIG. 4 are set to be in the state of rewrite inhibition. The parts are supposed to be referred to as equipment information. The "remaining fuel quantity" and the "remaining water quantity" are updated in real time at the time of generating electricity. The "nearest preceding fuel feed day" is updated when fuel feed from the fuel feeder 1 to the portable equipment 100 ends.

Next, referring to the flow chart shown in FIG. 5, the operation of the portable equipment 100 and the fuel feeder 1 at the time of feeding fuel is described. Here, the control unit 33 of the fuel feeder 1 reads a program to execute the program, and thereby control unit 33 performs the following operation. The control unit 117 of the portable equipment 100 reads a program of the storage unit 118 to execute the program, and thereby the control unit 117 performs the following operation.

When a user mounts the portable equipment 100 in the housing portion 6 of the fuel feeder 1, the mounting of the portable equipment 100 is detected by the attach/detach detection unit 31, and a detection signal of the mounting is outputted to the control unit 33. The control unit 33 performs communication with the control unit 117 based on the detection signal (Step S1), and the control unit 33 authenticates the mounted portable equipment as the portable equipment that can be dealt with in accordance with a predetermined algorithm when the communication can be performed (Step S2: Yes), and the control unit 33 allows to supply a fuel. Hereupon, when the portable equipment that cannot be dealt with by the fuel feeder 1 is mounted in the housing portion 6, the control unit 33 cannot perform normal communication, the control unit 33 does not authenticate the mounted portable equipment as the portable equipment that can be dealt with accordingly in the processing at Step S2 (Step S2: No), and the control unit 33 does not allow to supply a fuel. Then, the processing of the control unit 33 ends. In addition, although it is set that the control unit 33 performs the communication with the control unit 117 using the detection by the attach/detach detection unit 31 as a trigger, it may be set that the control unit 33 performs the communication with the control unit 117 using a detection signal of a touch of a replenishment button on the touch panel-bearing display 2 by the user as a trigger.

When the mounted portable equipment is authenticated as the portable equipment that can be dealt with (Step S2: Yes), the control unit 33 requests data from the control unit 117 (Step S3). When the control unit 117 receives the request, the control unit 117 reads the "model name", the "model number", the "presence or absence of settlement function", the "tank capacity", the "remaining fuel quantity", the "remaining water quantity" and the "nearest preceding fuel feed day" from the storage unit 118, and transmits the read data to the control unit 33. When the control unit 33 receives the "model name", the "model number", the "presence or absence of settlement function", the "tank capacity", the "remaining fuel quantity", the "remaining water quantity" and the "nearest preceding fuel feed day" from the control unit 117 (Step S4), the control unit 33 operates the touch panel-bearing display 2 to display a selection screen of the "full tank" and the "input of replenishment quantity" (Step S5).

When the user touches the touch panel-bearing display 2 at the part of the "input of replenishment quantity" (Step S6: No), the control unit 33 operates the touch panel-bearing display 2 to display the input screen of replenishment quantity (Step S7). On the other hand, when the user touches the touch panel-bearing display 2 at the part of the "full tank", the processing of the control unit 33 shifts to Step S9.

When the user has touched the touch panel-bearing display 2 at the input screen of replenishment quantity and a replenishment quantity has been inputted from the touch panel-bearing display 2 to the control unit 33, the control unit 33 subtracts the "remaining fuel quantity" from the tank capacity, and compares the difference with the replenishment quantity (Step S8). When the difference is larger than the replenishment quantity (Step S8: Yes), the processing of the control unit 33 shifts to Step S9. On the other hand, when the difference is smaller than the replenishment quantity (Step S8: No), the control unit 33 operates the touch panel-bearing display 2 to display the fact, and operates the touch panel-bearing display 2 to display the input screen of replenishment quantity again. Then, when the user has inputted a replenishment quantity after the re-display of the input screen of replenishment quantity, the control unit 33 similarly compares the difference with the replenishment quantity.

At Step S9, the control unit 33 opens the valves 16, 18, 23, 25 and 30, and the control unit 117, which has been received a command of the control unit 33, opens the valves 113-115.

Next, the control unit 33 confirms whether the "nearest preceding fuel feed day" is before a predetermined period from the present day or not (Step S10). When the "nearest preceding fuel feed day" is before the predetermined period from the present day (Step S10: Yes), the control unit 33 operates the fuel extraction pump 19, and thereby operates the fuel extraction pump 19 to extract the fuel in the fuel tank 101 of the portable equipment 100 by a small quantity. The fuel is sent to the waste liquid tank 27, and the concentration thereof detected by the concentration meter 20 provided on the way is inputted into the control unit 33 (Step S11). When the detected concentration has been inputted into the control unit 33, the control unit 33 stops the fuel extraction pump 19. Next, the control unit 33 judges whether the detected concentration is a reasonable value or not (Step S12). If the detected concentration is not the reasonable value as the result of the judgment at Step S12 (Step S12: No), the processing of the control unit 33 shifts to Step S20. The processing at Step S20 in the case where the detected concentration is not the reasonable value will be described later.

If the detected concentration is the reasonable value as the result of the judgment at Step S12 (Step S12: Yes), or if the "nearest preceding fuel feed day" is not before the predetermined period from the present day as the result of the confirmation at Step S10 (Step S10: No), then the control unit 33 operates the fuel feed pump 14 to feed the fuel in the fuel tank 10 to the fuel tank 101 of the portable equipment 100 (Step S13).

If the quantity of the fuel in the fuel tank 101 is, for example, 90% or less of the "tank capacity" during fuel feed, the control unit 33 operates the fuel feed pump 14 at a high speed. If the quantity of the fuel in the fuel tank 101 exceeds the 90% of the "tank capacity", the control unit 33 operates the fuel feed pump 14 at a lower speed than that in the case of 90% or less.

Moreover, if the user has not selected the full tank at Step S6 and has inputted a replenishment quantity at Step S7, the control unit 33 integrates the flow rate of fuel indicated by the flow meter 15 during the feeding of the fuel at Step S13, and thereby the control unit 33 obtains the aggregate fed quantity of the fuel from the time of the start of fuel feed. When the aggregate fed quantity of the fuel becomes equal to the input replenishment quantity, the control unit 33 stops the fuel feed pump 14. The input replenishment quantity is the data that has been inputted into the control unit 33 by a user's touch onto the touch panel-bearing display 2 on the input screen of the replenishment quantity at Step S7. On the other hand, the processing at Step S13 in the case where the user has selected the full tank at Step S6 will be described later.

In addition, the quantity of the fuel extracted by the small quantity at the examination step of the fuel is corrected by obtaining the quantity of the liquid sent by the pump 19 from the conducting time of the pump 19.

When the feeding of the fuel has ended, the control unit 33 operates the water feed pump 21 to feed the water in the water tank 12 to the water tank 102 of the portable equipment 100 (Step S14). Now, the control unit 33 obtains the aggregate fed quantity of the water by integrating the flow rate of the water indicated by the flow meter 22 from the start of the feeding of the water to the end of the feeding. When the feeding of the water has ended, the control unit 33 operates the waste liquid extraction pump 29 to extract the waste liquid in the waste liquid tank 103 of the portable equipment 100 to the waste liquid tank 27 (Step S15).

Next, the control unit 33 transmits the aggregate fed quantity of the fuel, the aggregate fed quantity of the water and the present day to the control unit 117, and instructs the updates of the "remaining fuel quantity", the "remaining water quantity" and the "nearest preceding fuel feed day" to the control unit 117 (Step S16). When the control unit 117 receives the aggregate fed quantity of the fuel, the control unit 117 adds the aggregate fed quantity of the fuel to the "remaining fuel quantity" of the storage unit 118, and updates the storage unit 118 using the sum of the addition as the "remaining fuel quantity." When the control unit 117 receives the aggregate fed quantity of the water, the control unit 117 adds the aggregate fed quantity of the water to the "remaining water quantity" of the storage unit 118, and updates the storage unit 118 using the sum as the "remaining water quantity." When the control unit 117 receives the present day, the control unit 117 updates the storage unit 118 using the present day as the "nearest preceding fuel feed day."

Next, the control unit 33 closes the valves 16, 18, 23, 25 and 30, and the control unit 117, which has received a command of the control unit 33, closes the valves 113-115 (Step S17).

Next, by performing communication between the non-contact communication transmitter/receiver unit 8 and the non-contact communication transmitter/receiver unit 116, and by performing communication between the settlement communication interface unit 32 and external equipment, the electric settlement of the aggregate fed quantity of fuel is performed (Step S18). Next, the control unit 33 operates the touch panel-bearing display 2 to display the fact of an end (Step S19), and the processing of the control unit 33 ends to make it possible for the user to remove the portable equipment 100 from the housing portion 6.

The processing of the control unit 33 in the case where the detected concentration is not a reasonable value at Step S12 is described.

If the detected concentration is not a reasonable value as the result of the judgment at Step S12 (Step S12: No), the control unit 33 operates the fuel extraction pump 19, and thereby the fuel in the fuel tank 101 of the portable equipment 100 is sent to the waste liquid tank 27, and all the fuel in the fuel tank 101 is extracted (Step S20). When the fuel in the fuel tank 101 has been completely extracted, the control unit 33 stops the fuel extraction pump 19. Next, the control unit 33 operates the fuel feed pump 14 to feed the fuel in the fuel tank 10 by the sum of the quantity of the extracted fuel to the fuel tank 101 of the portable equipment 100 and an input predetermined quantity of fuel (Step S13). In the case of input of the full tank, the full-tank detection unit 119 detects the full tank, and a detection signal of the full tank is inputted into the control unit 33. Then, the control unit 33 stops the fuel feed pump 14. In addition, when the flow rate detected by the flow meter 15 becomes zero in place of the full-tank detection unit 119, or when the pressure detected by the pressure gauge 17 rises, the control unit 33 may stop the fuel feed pump 14.

When the feed of fuel has ended, the processing of the control unit 33 shifts to Step S14, and the processing is continued similarly in the aforesaid case.

The processing of the control unit 33 at Step S13 when the user touches the touch panel-bearing display at the part of the "full tank" at Step S6 is described.

The control unit 33 operates the fuel feed pump 14 to feed the fuel in the fuel tank 10 to the fuel tank 101 of the portable equipment 100 (Step S13). Then, when the full-tank detection unit 119 detects the full tank and a detection signal of the full tank is inputted into the control unit 33, the control unit 33 stops the fuel feed pump 14. Moreover, the control unit 33 integrates the flow rate of the fuel indicated by the flow meter 15 during the feeding of the fuel, and thereby the control unit 33 obtains the aggregate fed quantity of the fuel from the time of the start of the fuel feed to the end thereof. If the obtained aggregate fed quantity of the fuel is within a predetermined error range (e.g. 10%) from the difference obtained by subtracting the "remaining fuel quantity" from the "tank capacity", the control unit 33 judges the case as the case where appropriate fuel feed has been performed from the fuel feeder, and the processing of the control unit 33 shifts to Step S14. Then, the processing is continued similarly in the aforesaid case, and the control unit 117 stores the "tank capacity" into the storage unit 118 as the "remaining fuel quantity" at Step S16. On the other hand, if the obtained aggregate fed quantity of the fuel is not within the predetermined error range from the difference obtained by subtracting the "remaining fuel quantity" from the "tank capacity", the control unit 33 judges the case as the case where inappropriate fuel feed is performed from an apparatus other than the fuel feeder, and any one of the following (a)-(c) use limitations is performed.

(a) The control unit 33 operates the touch panel-bearing display 2 to display a "break down (unjust filling) error", and the control unit 33 commands the control unit 117 to make the "remaining fuel quantity" of the storage unit 118 zero to store it. After that, the control unit 33 does not perform the processing at Steps S14-S16, and the processing of the control unit 33 ends through the processing at Steps S17, S18 and S19. Consequently, because the "remaining fuel quantity" of the storage unit 118 is zero even if the fuel tank 101 is full tank, the control unit 117 cannot make the pumps 104 and 105 operate, and no electric power can be extracted from the fuel cell 109. Consequently, the use of the portable equipment 100 is limited. (In this case, it may be set to change the settlement amount or not to perform the settlement at Step S18.)

(b) The control unit 33 operates the touch panel-bearing display 2 to display the "break down (unjust filling) error", and the control unit 33 transmits the aggregate fed quantity of fuel to the control unit 117 to allow the control unit 117 to store the aggregate fed quantity as the "remaining fuel quantity" of the storage unit 118. After that, the control unit 33 does not perform the processing at Steps S14-S16, and the processing of the control unit 33 ends through the processing at Steps S17, S18 and S19. Thereby, because the "remaining fuel quantity" of the storage unit 118 is only the aggregate fed quantity of the fuel fed at this time even if the fuel tank 101 is full tank, only the fuel quantity of the aggregate fed quantity can be used, and the remaining fuel (unjustly filled fuel) cannot be used. Consequently, the use of the portable equipment 100 is limited.

(c) The control unit 33 does not especially perform any alarm displays such as "break down (unjust filling) error" on the touch panel-bearing display 2, but the control unit 33 transmits the aggregate fed quantity of fuel to the control unit 117 to allow the control unit 117 to store the aggregate fed quantity as the remaining fuel quantity of the storage unit 118. After that, the control unit 33 does not perform the processing at Steps S14-S16, and the processing of the control unit 33 ends through the processing at Steps S17, S18 and S19. Thereby, because the "remaining fuel quantity" of the storage unit 118 is only the aggregate fed quantity of the fuel fed at this time similarly to the case of the aforesaid (b) even if the fuel tank 101 is full tank, only the fuel of the aggregate fed quantity can be used, and the remaining fuel quantity (unjustly filled fuel quantity) cannot be used. Consequently, the use of the portable equipment 100 is limited.

If such mechanisms are adopted, the usability of a user becomes worse, the user does not perform unjust fuel injection, which is accompanied by break down and danger, from the apparatus other than the fuel feeder, and the equipment can be safely used.

In addition, if the aggregate fed quantity of the fuel is within the predetermined error range from the difference obtained by subtracting the "remaining fuel quantity" from the "tank capacity", the remaining fuel quantity is displayed as 100% in order not to accumulate errors.

As described above, because the fuel feed pump 14 operates to feed the fuel from the fuel feeder 1 to the portable equipment 100 like the processing at Step S13 when authentication has been performed by the communication between the control unit 33 and the control unit 117 like the processing at Steps S1 and S2, the fuel corresponding to the portable equipment 100 can be correctly fed to the portable equipment 100. Because the communication function that is owned by the portable equipment 100 itself is used for the authentication of the portable equipment 100, it is unnecessary to separately add the function of identifying what kind of portable equipment is mounted in the housing portion 6, and cost reduction can be achieved.

Moreover, if the "nearest preceding fuel feed day" is stored in the storage unit 118 of the portable equipment 100 and the "nearest preceding fuel feed day" is before the predetermined period at the time of fuel replenishment (Step S10: Yes), all the fuel in the portable equipment 100 is set to be extracted like the processing at Step S20. Consequently, the state in which old fuel remains in the portable equipment 100 can be removed. Thereby, the break-down of the micro reactor 106, the fuel cell 109 and the like can be prevented.

Moreover, the concentration of the fuel in the portable equipment 100 is detected (Step S11), and all the fuel in the portable equipment 100 is extracted like the processing at Step S20 if the detected concentration is not a reasonable value. Consequently, the state in which deteriorated fuel remains in the portable equipment 100 can be removed. As a result, the break-down of the micro reactor 106, the fuel cell 109 and the like can be prevented.

In addition, the present invention is not limited to the aforesaid embodiments, but various improvements and design changes may be performed without departing from the sprit and the scope of the present invention.

Although, in the embodiments, a small quantity of the fuel in the fuel tank 101 of the portable equipment 100 is extracted and it is judged whether the concentration of the fuel is a reasonable value or not using the concentration meter 20 if the "nearest preceding fuel feed day" is before a predetermined period from the present day, the examination of the concentration may be performed independently of whether the "nearest preceding fuel feed day" is before the predetermined period from the present day or not.

Moreover, in order to perform the more detailed ingredient examination of fuel than the detection of the concentration thereof, a content meter may be provided to perform the examination of the ingredients, and the result of the examination may be judged to be proper or not.

Moreover, although the example of extracting all the fuel at Step S20 has been described in the aforesaid embodiments, the configuration of extracting the fuel while remaining a part of the fuel within a range of exerting no influences on the safety of the system may be adopted.

Furthermore, the example of managing and storing the nearest preceding fuel feed day has been described in the aforesaid embodiments for simplification, the timing of fuel feed may be stored as the fuel feed history without limiting the nearest preceding (the last time) feeding, and the history of the fuel remaining in the fuel tank may be managed and stored in detail. It is needless to say that the objects of the management and the storage are not limited to the feed days as long as the timing (the times) of feeding can be known.

Although the fuel cell 109 has been a reformer fuel cell in the aforesaid embodiments, a direct fuel type fuel cell may be used. In this case, a vaporizer is provided in place of the micro reactor 106; fuel send by the pump 104 and water sent by the pump 105 are mixed by the vaporizer to be vaporized; and a gaseous mixture of the fuel and the water is fed to the anode of the fuel cell 109.

Moreover, although the communication between the control unit 33 and the control unit 117 is established by the connection of the feeder side fuel injection/extraction interface unit 7 to the portable equipment side fuel injection/extraction interface unit 112 in the aforesaid embodiments, the communication between the control unit 33 and the control unit 117 may be established by performing infrared communication between the infrared communication unit 9 of the fuel feeder 1 and the infrared communication unit 120 of the portable equipment 100. In this case, the infrared communication unit 9 is the first communication unit, and the infrared communication unit 120 is the second communication unit.

Moreover, although the electric settlement has been performed using the non-contact communication transmitter/ receiver unit 8 and the settlement communication interface unit 32 at Step S18, cash settlement may be performed by using the bill throwing-in portion 3 and the coin throwing-in portion 4.

Moreover, although the example of performing the authentication by communication has been described in the aforesaid embodiments, the authentication may not always use the communication if the feeder side can obtain the equipment information of portable equipment, and a simple system of performing fuel feed by reading, for example, a bar code described on the portable equipment may be adopted. Moreover, the portable equipment may be configured to be provided with a fuel indicator or the like to make it possible to optically read the remaining fuel quantity from the outside.

All of the disclosures including the patent specification, the claims, the attached drawings and the abstract of Japanese Patent Application No. 2006-90929 filed Mar. 29, 2006 are herein incorporated by reference.

Although various typical embodiments have been shown and described, the present invention is not limited to those embodiments. Consequently, the scope of the present invention can be limited only by the following claims.

What is claimed is:

1. A fuel feeder comprising:
    a fuel reserve body to reserve a fuel;
    a fuel feed unit to feed the fuel in the fuel reserve body to electronic equipment;
    a control unit to control the fuel feed unit, wherein the control unit obtains equipment information from the electronic equipment and operates the fuel feed unit to feed the fuel to the electronic equipment after the control unit has performed authentication of the electronic equipment;
    a content meter to examine fuel ingredients; and
    a fuel extraction unit to extract fuel remaining in the electronic equipment;
    wherein the control unit operates the fuel extraction unit to extract a part of the fuel remaining in the electronic equipment, and controls the content meter to examine the ingredients of the extracted fuel;
    wherein when the ingredients examined by the content meter are not proper, the control unit operates the fuel extraction unit to continue extracting the remaining fuel from the electronic equipment, and then the control unit operates the fuel feed unit to feed the fuel to the electronic equipment after the remaining fuel has been extracted from the electronic equipment; and
    wherein when the ingredients examined by the content meter are proper, the control unit operates the fuel extraction unit so as not to extract the remaining fuel from the electronic equipment and operates the fuel feed unit to feed the fuel to the electronic equipment.

2. The fuel feeder according to claim 1, wherein the content meter comprises a concentration meter to measure a concentration of the fuel.

3. The fuel feeder according to claim 1, further comprising:
    a waste fuel reserve body to waste the fuel extracted by the fuel extraction unit.

4. The fuel feeder according to claim 1, wherein:
    the control unit obtains a fuel feed history of times when the fuel has been fed to the electronic equipment, from the electronic equipment, and
    when the control unit judges that a most recent fueling of the electronic equipment was before a predetermined period based on the obtained fuel feed history, the control unit operates the fuel extraction unit to extract the part of the fuel remaining in the electronic equipment, and controls the content meter to examine the ingredients of the extracted fuel.

5. The fuel feeder according to claim 4, wherein when the control unit judges that the most recent fueling of the electronic equipment was not before the predetermined period based on the obtained fuel feed history, the control unit operates the fuel feed unit to feed the fuel to the electronic equipment without operating the fuel extraction unit to extract the part of the fuel remaining in the electronic equipment and without controlling the content meter to examine the ingredients of the extracted fuel.

6. The fuel feeder according to claim 1, wherein:
    the fuel feeder further comprises an input unit to input a replenishment quantity of the fuel,
    the control unit obtains a remaining fuel quantity and the capacity of a fuel reserve body of a electronic equipment from the electronic equipment,
    the control unit obtains a difference by subtracting the obtained remaining fuel quantity from the obtained capacity and compares the obtained difference with the replenishment quantity inputted via the input unit, and
    the control unit operates the fuel feed unit to feed the fuel when the obtained difference is larger than the replenishment quantity inputted via the input unit.

7. The fuel feeder according to claim 1, wherein the control unit commands the electronic equipment to update remaining fuel quantity information stored in the electronic equipment when the fuel feed unit has finished feeding the fuel.

8. The fuel feeder according to claim 1, further comprising a water feed unit to feed water to the electronic equipment.

\* \* \* \* \*